United States Patent [19]

Ohki

[11] Patent Number: 5,285,405
[45] Date of Patent: Feb. 8, 1994

[54] INNER PRODUCT CALCULATING CIRCUIT

[75] Inventor: Mitsuharu Ohki, Tokyo, Japan

[73] Assignee: Sony Corporation, Tokyo, Japan

[21] Appl. No.: 942,410

[22] Filed: Sep. 9, 1992

[30] Foreign Application Priority Data

Sep. 13, 1991 [JP] Japan ............................ 3-261403

[51] Int. Cl.⁵ ........................... G06F 7/38; G06F 7/52
[52] U.S. Cl. ................................ 364/750.5; 364/754; 364/757
[58] Field of Search ..................... 364/750.5, 754, 757, 364/758, 759, 760

[56] References Cited

U.S. PATENT DOCUMENTS

| | | | |
|---|---|---|---|
| 4,495,593 | 1/1985 | Ware | 364/757 |
| 4,573,136 | 2/1986 | Rossiter | 364/757 X |
| 4,736,335 | 4/1988 | Barkan | 364/750.5 X |
| 4,868,778 | 9/1989 | Disbrow | 364/757 |
| 4,958,312 | 9/1990 | Ang et al. | 364/754 |

Primary Examiner—Long T. Nguyen
Assistant Examiner—C. Ngo
Attorney, Agent, or Firm—William S. Frommer; Alvin Sinderbrand

[57] ABSTRACT

An inner product calculating circuit for executing a calculation of an inner product on the basis of one or more vector data and one or more coefficients. The circuit comprises a selective inverter for selectively inverting individual bits of the vector data; a bit position shifter for shifting, in accordance with the coefficients, the bit positions of the vector data inverted selectively by the selective inverter; a bit supplementer for supplementing, with either "1" or "0", any vacant bit of the vector data where the bit positions have been shifted by the bit position shifter; and an accumulator for accumulating the initial values preset in conformity with the coefficients and the vector data supplemented with "1" or "0" in any vacant bit thereof by the bit supplementer. This circuit configuration is capable of eliminating the necessity of a powerful buffer or a low-order bit controller to consequently achieve a reduction in the circuit scale while realizing a fast inner product calculation merely by presetting specific values as initial values in conformity with the coefficients.

1 Claim, 16 Drawing Sheets

F I G. 3
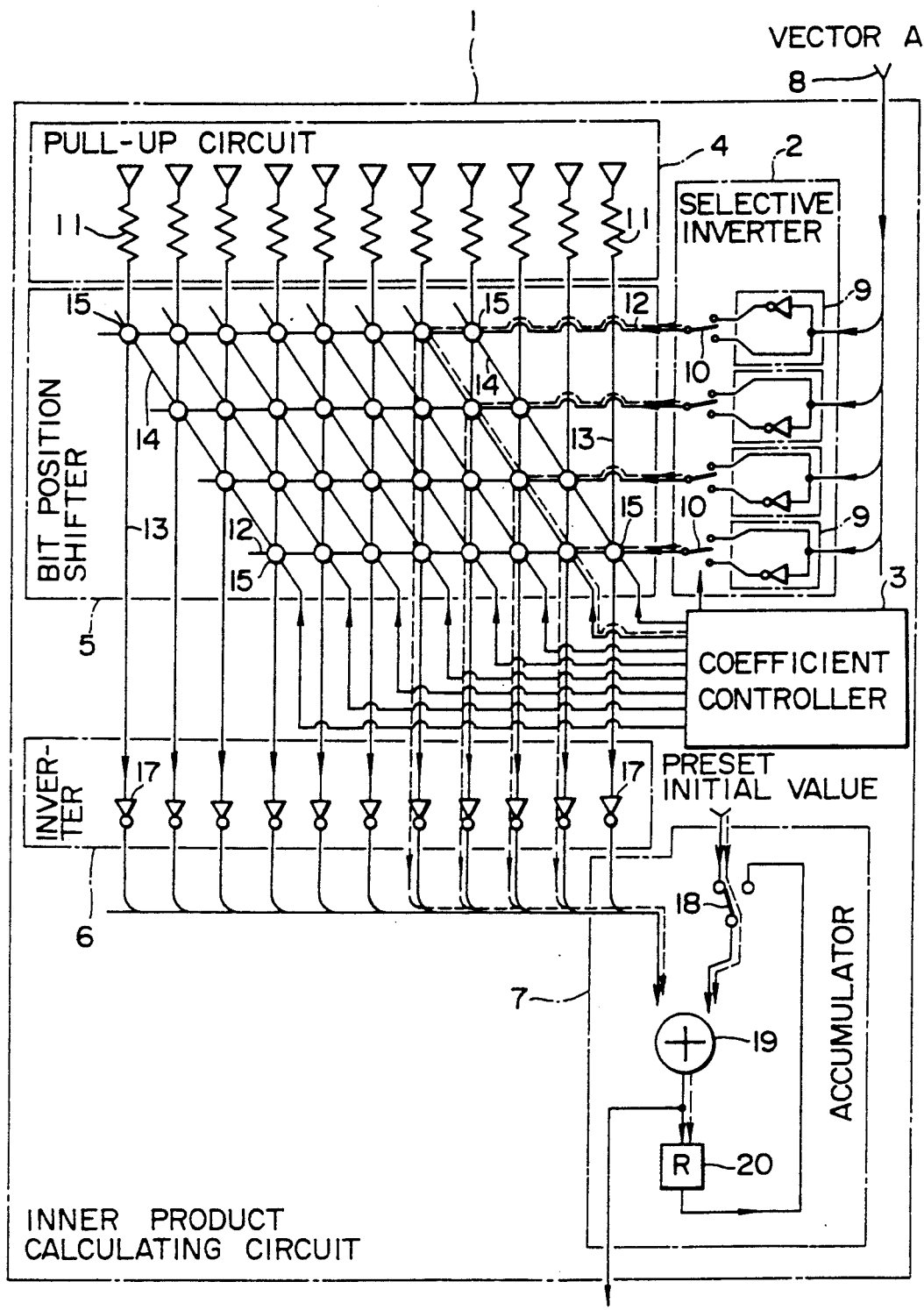

F I G. 12
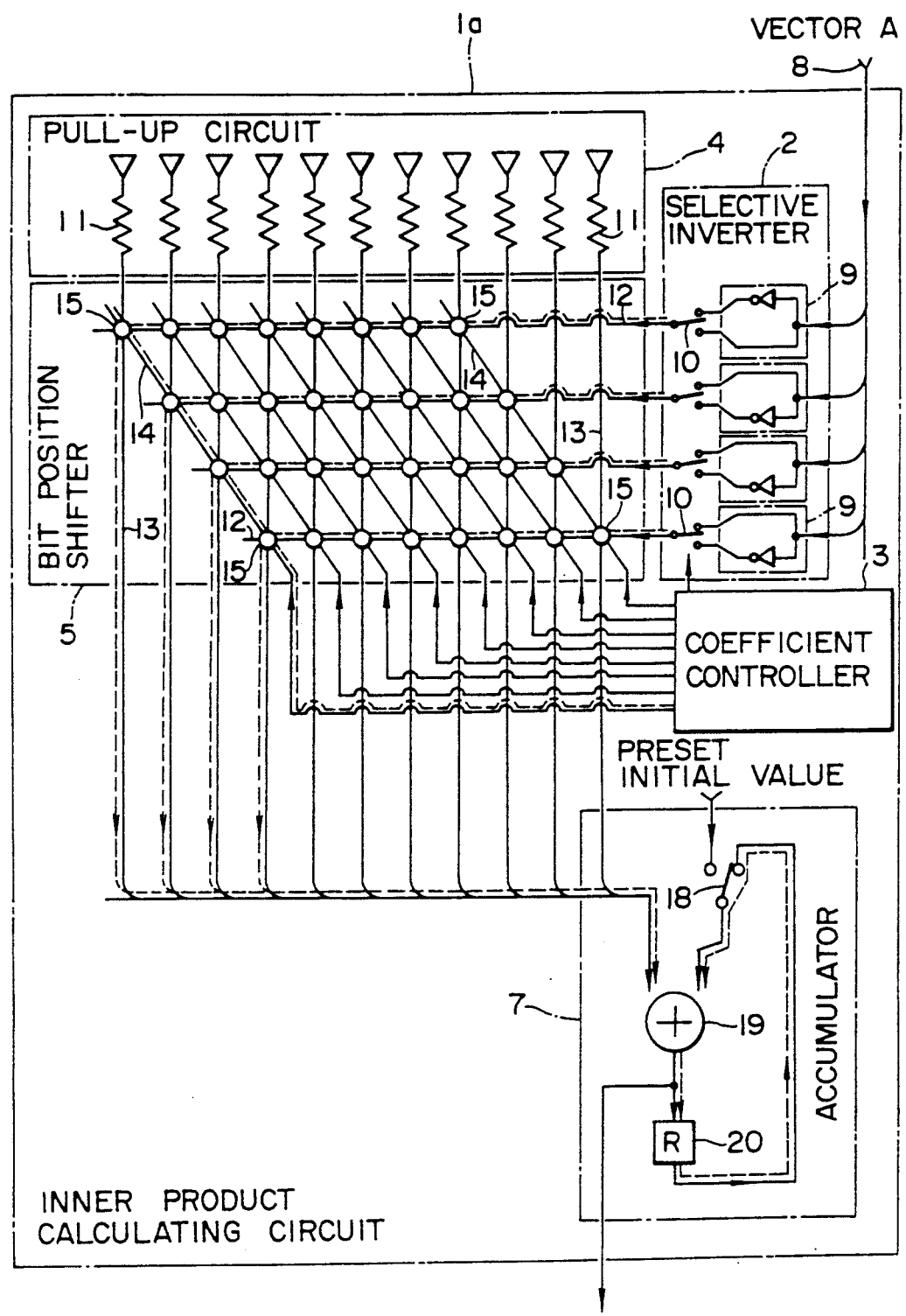

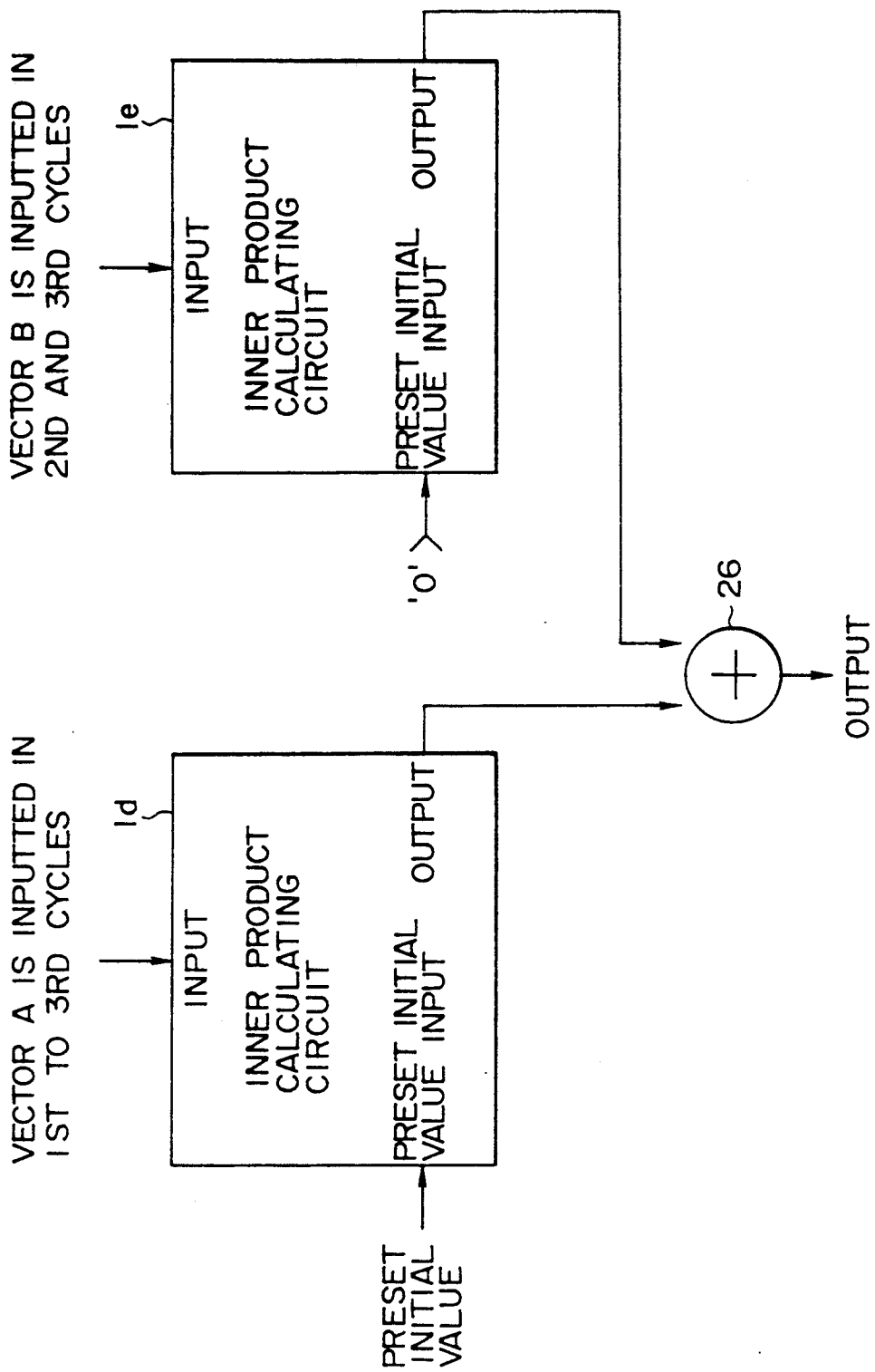

INNER PRODUCT CALCULATING CIRCUIT

BACKGROUND OF THE INVENTION

1. Field of the Invention

The present invention relates to an inner product calculating circuit for executing a high-speed inner product calculation which is known as one of vector calculations.

2. Description of the Prior Art

An inner product calculation corresponding to one vector calculation is executed to obtain the inner product value of vectors and coefficients, which are objects to be calculated, in accordance with the following fundamental principle. It is defined in the description below that an underlined character "$\underline{O}$" denotes an alphabetic "O", and other underlined characters "$\underline{A_i}$", "$\underline{B_i}$" and "$\underline{I_i}$" denote inverted bits.

First an explanation will be given with regard to an exemplary case of finding the inner product $\underline{O}$ of two vector coefficients C0, C1 and two vectors A, B as expressed by Eq. (1) below.

$$\underline{O} = C0 \cdot A + C1 \cdot B \qquad (1)$$

where $$\underline{O}: \underline{O} = (\underline{O_{12}}, \underline{O_{11}} \ldots \underline{O_1}, \underline{O_0})$$

$$\begin{aligned} C_0: C_0 &= 2^6 + 2^5 + 2^4 + 2^2 + 2^1 \\ &= (0\ 1\ 1\ 1\ 0\ 1\ 1\ 0)_2 \end{aligned}$$

$$\begin{aligned} C_1: C_1 &= 2^5 + 2^4 + 2^3 + 2^2 + 2^1 + 2^0 \\ &= (0\ 0\ 1\ 1\ 1\ 1\ 1\ 1)_2 \end{aligned}$$

$$\begin{aligned} A: A &= A_3 2^3 + A_2 2^2 + A_1 2^1 + A_0 2^0 \\ &= (A_3, A_2, A_1, A_0)_2 \quad (A_i = 0,1) \end{aligned}$$

$$\begin{aligned} B: B &= B_3 2^3 + B_2 2^2 + B_1 2^1 + B_0 2^0 \\ &= (B_3, B_2, B_1, B_0)_2 \quad (B_i = 0,1) \end{aligned}$$

The coefficients C0 and C1 in the above equation can be modified as follows.

$$\begin{aligned} C_0 &= 2^6 + 2^5 + 2^4 + 2^2 + 2^1 \\ &= 2^7 - 2^3 - 2^1 \\ &= (1\ 0\ 0\ 0\ -1\ 0\ -1\ 0)_2 \end{aligned} \qquad (2)$$

$$\begin{aligned} C_1 &= 2^5 + 2^4 + 2^3 + 2^2 + 2^1 + 2^0 \\ &= 2^6 - 2^0 \\ &= (0\ 1\ 0\ 0\ 0\ 0\ 0\ -1)_2 \end{aligned} \qquad (3)$$

Therefore, Eq. (1) can be modified to the following equation.

$$\begin{aligned} O &= C_0 \cdot A + C_1 \cdot B \\ &= -2^1 \cdot A - 2^3 \cdot A + 2^7 \cdot A - 2^0 \cdot B + 2^6 \cdot B \end{aligned} \qquad (4)$$

As apparent from Eq. (4), it is possible to calculate Eq. (1) under the conditions of the proviso relative thereto by executing a process of shifting the bits of the vectors A and B, a process of multiplying such vectors by "$-1$", and another process of adding the five partial products expressed in Eq. (4).

The first term in Eq. (4) can be modified as follows.

$$\begin{aligned} -2^1 \cdot A &= -2^1 \cdot (A_3 A_2 A_1 A_0)_2 \\ &= (-1) \cdot (A_3 A_2 A_1 A_0\ 0)_2 \\ &= (\underline{A_3}\ \underline{A_2}\ \underline{A_1}\ \underline{A_0}\ 1)_2 + (1)_2 \end{aligned} \qquad (5)$$

For determining the number of bits of the inner product $\underline{O}$ in Eq. (1) to a preset value such as 13, Eq. (6) is obtained with bit extension by copying the most significant bit (code bit) in Eq. (5) to the high-order side.

$$-2^1 \cdot A = (\underline{A_3}\ \underline{A_3}\ \underline{A_3}\ \underline{A_3}\ \underline{A_3}\ \underline{A_3}\ \underline{A_3}\ \underline{A_3}\ \underline{A_3}\ \underline{A_2}\ \underline{A_1}\ \underline{A_0}\ 1)_2 + (1)_2 \qquad (6)$$

Similarly to the above, the following equation is obtained with bit extension by executing the same process with regard to the second term in Eq. (4).

$$\begin{aligned} -2^3 \cdot A &= -2^3 \cdot (A_3 A_2 A_1 A_0)_2 \\ &= (\underline{A_3}\ \underline{A_3}\ \underline{A_3}\ \underline{A_3}\ \underline{A_3}\ \underline{A_3}\ \underline{A_3}\ \underline{A_2}\ \underline{A_1}\ \underline{A_0}\ 1\ 1\ 1)_2 + (1)_2 \end{aligned} \qquad (7)$$

Similarly, Eq. (8) is obtained with bit extension by executing the same process with regard to the third term in Eq. (4).

$$\begin{aligned} +2^7 \cdot A &= +2^7 \cdot (A_3 A_2 A_1 A_0)_2 \\ &= (A_3 A_3 A_3 A_2 A_1 A_0\ 0\ 0\ 0\ 0\ 0\ 0\ 0)_2 \end{aligned} \qquad (8)$$

Similarly, Eq. (9) is obtained with bit extension by executing the same process with regard to the fourth term in Eq. (4).

$$\begin{aligned} -2^0 \cdot B &= -2^0 \cdot (B_3 B_2 B_1 B_0)_2 \\ &= (\underline{B_3}\ \underline{B_3}\ \underline{B_3}\ \underline{B_3}\ \underline{B_3}\ \underline{B_3}\ \underline{B_3}\ \underline{B_3}\ \underline{B_3}\ \underline{B_3}\ \underline{B_2}\ \underline{B_1}\ \underline{B_0})_2 + (1)_2 \end{aligned} \qquad (9)$$

Further similarly to the above, Eq. (10) is obtained with bit extension by executing the same process with regard to the fifth term in Eq. (4).

$$\begin{aligned} 2^6 \cdot B &= +2^6 \cdot (B_3 B_2 B_1 B_0)_2 \\ &= (B_3 B_3 B_3 B_3 B_2 B_1 B_0\ 0\ 0\ 0\ 0\ 0\ 0)_2 \end{aligned} \qquad (10)$$

Consequently, the calculation of Eq. (4) corresponds to the following calculation executed by means of an accumulator.

$$\begin{Bmatrix} \underline{A_3} & \underline{A_3} & \underline{A_3} & \underline{A_3} & \underline{A_3} & \underline{A_3} & \underline{A_3} & \underline{A_3} & \underline{A_3} & \underline{A_2} & \underline{A_1} & \underline{A_0} & 1 \\ & & & & & & & & & & & & 1 \\ \underline{A_3} & \underline{A_3} & \underline{A_3} & \underline{A_3} & \underline{A_3} & \underline{A_3} & \underline{A_3} & \underline{A_2} & \underline{A_1} & \underline{A_0} & 1 & 1 & 1 \\ & & & & & & & & & & & & 1 \\ A_3 & A_3 & A_3 & A_2 & A_1 & A_0 & 0 & 0 & 0 & 0 & 0 & 0 & 0 \\ \underline{B_3} & \underline{B_3} & \underline{B_3} & \underline{B_3} & \underline{B_3} & \underline{B_3} & \underline{B_3} & \underline{B_3} & \underline{B_3} & \underline{B_3} & \underline{B_2} & \underline{B_1} & \underline{B_0} \\ & & & & & & & & & & & & 1 \\ + B_3 & B_3 & B_3 & B_3 & B_2 & B_1 & B_0 & 0 & 0 & 0 & 0 & 0 & 0 \\ \hline O_{12} & O_{11} & O_{10} & O_9 & O_8 & O_7 & O_6 & O_5 & O_4 & O_3 & O_2 & O_1 & O_0 \end{Bmatrix} \qquad (11)$$

In practically executing the calculation of Eq. (11) by a circuit, it is necessary to supply the code bits (A3, $\underline{A_3}$, B3, $\underline{B_3}$) of the partial products to the entire high-order bits in the accumulator, hence requiring in the input stage an adequate buffer which has a sufficient driving capability.

As will be understood from Eq. (11), a control circuit is needed for adding either "1" or "0" to the low-order side.

Accordingly, there arises a problem that the circuit scale is increased to a great extent in the case of executing the above inner product calculation.

OBJECT AND SUMMARY OF THE INVENTION

It is therefore an object of the present invention to provide an improved inner product calculating circuit which is adapted to eliminate the necessity of a powerful buffer or a low-order bit controller to consequently reduce the circuit scale and is capable of executing a fast inner product calculation with the aforementioned coefficients merely by presetting specific values as initial values in conformity with the coefficients.

According to one aspect of the present invention, there is provided a circuit for executing a calculation of an inner product on the basis of one or more vector data and one or more coefficients. The circuit comprises a selective inverter for selectively inverting individual bits of the vector data; a bit position shifter for shifting, in accordance with the coefficients, the bit positions of the vector data inverted selectively by the selective inverter; a bit supplementer for supplementing, with either "1" or "0", any vacant bit of the vector data where the bit positions have been shifted by the bit position shifter; and an accumulator for accumulating the initial values preset in conformity with the coefficients and the vector data supplemented with "1" or "0" in any vacant bit thereof by the bit supplementer.

In the constitution mentioned above, after selective inversion of the vector data bits by the selective inverter, the bit positions of the vector data selectively inverted by the selective inverter are changed by the bit position shifter in conformity with the coefficients. And either "1" or "0" is given to any vacant bit of the vector data whose bit position has been shifted by the bit position shifter, and then the vector data supplemented with "1" or "0" in the vacant bits thereof by the bit supplementer are cumulatively added by the accumulator to the initial values preset in conformity with the coefficients, thereby obtaining the result of the inner product calculation of the vector data and the coefficients.

The above and other features and advantages of the present invention will become apparent from the following description which will be given with reference to the illustrative accompanying drawings.

BRIEF DESCRIPTION OF THE DRAWINGS

FIG. 3 is a typical diagram showing a first operation cycle in the inner product calculating circuit of FIG. 1;

FIG. 12 is a typical diagram showing a third operation cycle in the inner product calculating circuit of FIG. 8;

FIG. 16 is a block diagram of a fourth embodiment representing the inner product calculating circuit of the present invention.

DESCRIPTION OF THE PREFERRED EMBODIMENTS

Figure 1:
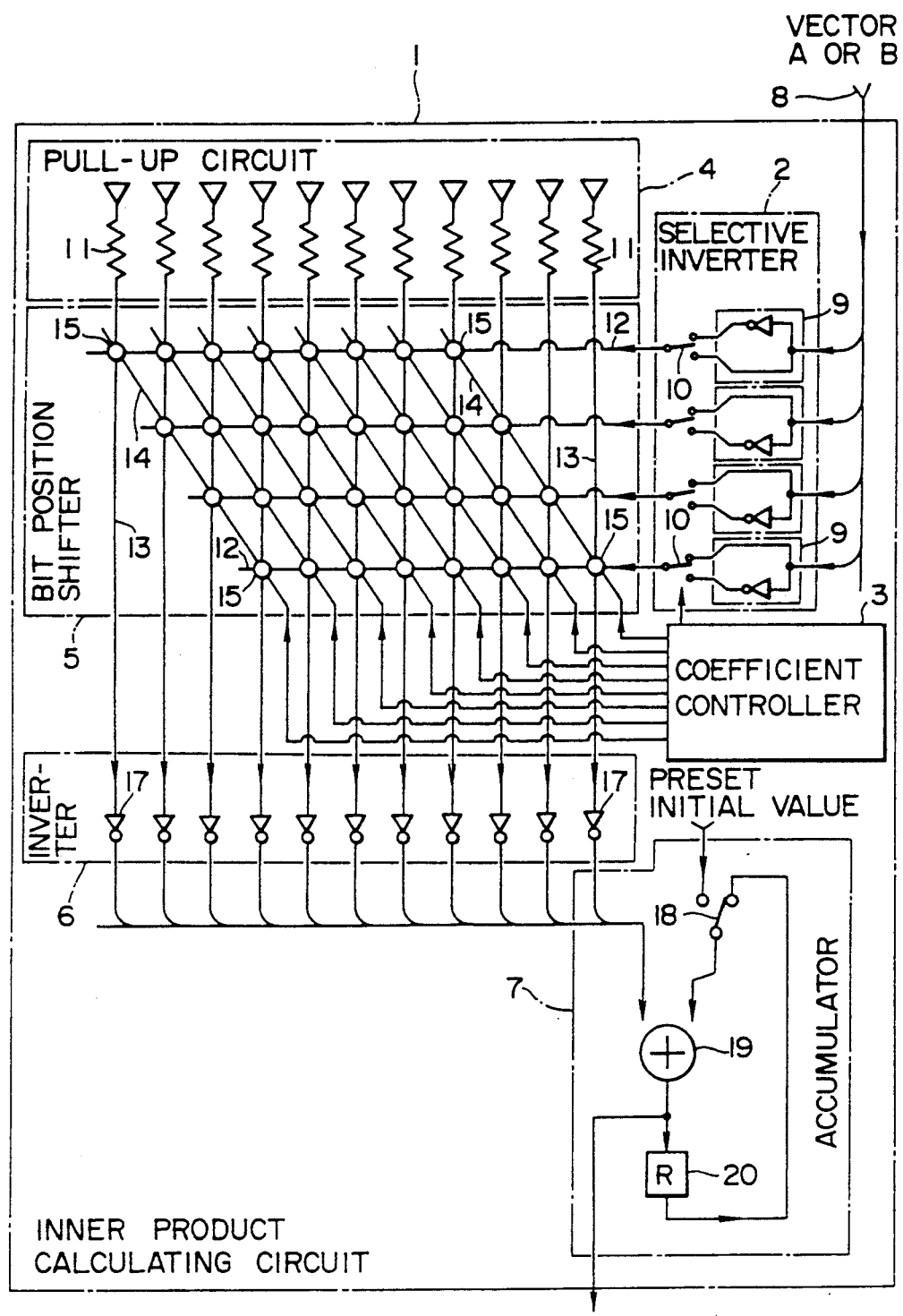
FIG. 1 is a block diagram of a first embodiment representing the inner product calculating circuit of the present invention.

Prior to giving an explanation on a detailed circuit configuration of a first embodiment, the fundamental principle of the inner product calculating circuit of the present invention will be described below.

In a general bit calculation, the following equation is valid.

$$\left.\begin{array}{l}(0 \quad 0 \quad \ldots \quad 0 \quad I_{n-1} \; I_{n-2} \; I_{n-3} \ldots I_2 \; I_1 \; I_0)_2 + \\ (1 \quad 1 \quad \ldots \quad 1 \quad \overline{I_{n-1}} \; 0 \quad 0 \quad \ldots 0 \; 0 \; 0)_2 = \\ (I_{n-1} \; I_{n-1} \ldots I_{n-1} \; I_{n-1} \; I_{n-2} \; I_{n-3} \ldots I_2 \; I_1 \; I_0)_2 \end{array}\right\} \quad (12)$$

Here, the values in the following equation are allocated to Eq. (12).

$$\left.\begin{array}{l}I_{n-1} = A3, \underline{A3}, B3 \text{ or } \overline{B3} \\ I_{n-2} = A2, \underline{A2}, B2 \text{ or } \overline{B2} \\ I_{n-3} = A1, \underline{A1}, B1 \text{ or } \overline{B1} \\ I_{n-4} = A0, \underline{A0}, B0 \text{ or } \overline{B0} \\ I_{n-5} - I_0 = 0 \text{ or } 1\end{array}\right\} \quad (13)$$

Then, Eq. (11) may be expressed as follows by applying Eqs. (12) and (13) thereto.

```
 1  1  1  1  1  1  1  1  1                    (a)
                   A₃ A₂ A₁ A₀ 1               (b)
                               1               (c)
 1  1  1  1  1  1  1                           (d)
                   A₃ A₂ A₁ A₀ 1  1  1         (e)
                                  1            (f)
 1  1  1                                       (g)
       A₃ A₂ A₁ A₀                             (h)      (14)
 1  1  1  1  1  1  1  1  1                     (i)
                   B₃ B₂ B₁ B₀                 (j)
                               1               (k)
 1  1  1                                       (l)
+        B₃ B₂ B₁ B₀                           (m)
─────────────────────────────────────────
 O₁₂ O₁₁ O₁₀ O₉ O₈ O₇ O₆ O₅ O₄ O₃ O₂ O₁ O₀     (n)
```

Eq. (15) is obtained by transposing upward every "1" included in the stages (a), (b), (c), (d), (e), (f), (g), (i), (k) and (l) of Eq. (14).

```
 1  1  1  1  1  1  1  1                    1   (a)
                                            1  (b)
 1  1  1  1  1  1                1   1  1      (c)
                                            1  (d)
 1  1  1                                       (e)
 1  1  1  1  1  1  1  1  1                     (f)
                                            1  (g)
 1  1  1                                       (h)    (15)
                   A₃ A₂ A₁ A₀                 (i)
                A₃ A₂ A₁ A₀                    (j)
       A₃ A₂ A₁ A₀                             (k)
                         B₃ B₂ B₁ B₀           (l)
+              B₃ B₂ B₁ B₀                     (m)
─────────────────────────────────────────
 O₁₂ O₁₁ O₁₀ O₉ O₈ O₇ O₆ O₅ O₄ O₃ O₂ O₁ O₀    (n)
```

Calculating "1" in the stages (a) through (h) of Eq. (15), there is obtained the following equation.

```
   1 1 1 1 1 1 1 1        1   (a)
                          1   (b)
   1 1 1 1 1 1 1      1 1 1   (c)
                          1   (d)
   1 1 1                      (e)   (16)
   1 1 1 1 1 1 1 1 1          (f)
                          1   (g)
 + 1 1 1                      (h)
 ─────────────────────────
   1 1 0 0 1 1 0 1 1 0 0 1 1
```

It is therefore possible to modify Eq. (15) as follows.

```
 1  1  0  0  1  1  0  1  1  0  0  1  1         (a)
 0  0  0  0  0  0 A₃ A₂ A₁ A₀ 0  0  0           (b)
 0  0  0  0 A₃ A₂ A₁ A₀ 0  0  0  0  0           (c)
 A₃ A₂ A₁ A₀ 0  0  0  0  0  0  0  0  0          (d)   (17)
 0  0  0  0  0  0  0  0 B₃ B₂ B₁ B₀ 0           (e)
+0 B₃ B₂ B₁ B₀ 0  0  0  0  0  0  0  0           (f)
─────────────────────────────────────────
 O₁₂ O₁₁ O₁₀ O₉ O₈ O₇ O₆ O₅ O₄ O₃ O₂ O₁ O₀     (g)
```

Thus, the value of Eq. (1) can be found by calculating Eq. (17).

The first embodiment of the present invention is based on the fundamental principle that finds the result of Eq. (1) by executing the calculation of Eq. (17).

Hereinafter the first embodiment of the present invention adopting such fundamental principle will be described in detail with reference to the accompanying drawings.

FIG. 1 is a block diagram of the first embodiment representing the inner product calculating circuit of the invention.

The inner product calculating circuit 1 shown in this diagram comprises a selective inverter 2, a coefficient controller 3, a pull-up circuit 4, a bit position shifter 5, an inverter 6 and an accumulator 7. The selective inverter 2 and the bit position shifter 5 are controlled by the coefficient controller 3 to cause individual noninversion or inversion of the bits of vectors A, B which are objects of the inner product calculation, while the bit positions of the vectors A, B are shifted to produce inverted ones of the bit strings in the stages (b) through (f) of Eq. (17), and thereafter such bit strings are introduced to the inverter 6 so as to be inverted. Then the accumulator 7 functions to sequentially accumulate the preset initial value in the stage (a) of Eq. (17) and the bit strings in the stages (b) to (f) of Eq. (17) outputted from the inverter 6, thereby calculating and delivering the inner product value $O$ of Eq. (17).

The coefficient controller 3 has a control table with selectable data corresponding to the values of the coefficients C0, C1 to be calculated for the inner product, and also has a read circuit and so forth for reading out the selectable data included in such control table. The selectable data are read out from the control table in response to an input clock signal to produce two selected signals, which are then supplied to the selective inverter 2 and the bit position shifter 5 respectively.

The selective inverter 2 comprises four inverting/non-inverting circuits 9 for individual bits of the vectors A, B fed to the input terminal 8, and four selector switches 10 for selecting either the inverted bit signals or the non-inverted bit signals outputted from such inverting/non-inverting circuits 9. The bits of the vector A or B fed to the input terminal 8 are inverted or non-inverted by the inverting/non-inverting circuits 9, and either the inverted bits or the non-inverted bits outputted from the inverting/non-inverting circuits 9 are selected in accordance with the selection signal outputted from the coefficient controller 3 and then are supplied to the bit position shifter 5.

The pull-up circuit 4 has eleven resistors 11 and serves to pull up the selector switches 15 of the bit position shifter 5 by the voltage being applied to one end of each resistor 11.

The bit position shifter 5 comprises four bit input lines (horizontal lines) 12, eleven output lines (vertical lines) 13, eight control lines (oblique lines) 14, and a plurality of selector switches 15 disposed at the intersections of the input lines 12 and the control lines 14. When a selection signal is supplied from the coefficient controller 3 to any of the control lines 14, the positions of the bits being fed from the selective inverter 2 to the input lines 12 are determined, and "1" is set in any other bit than the above bits to form an 11-bit string, which is then supplied to the inverter 6.

Figure 2:
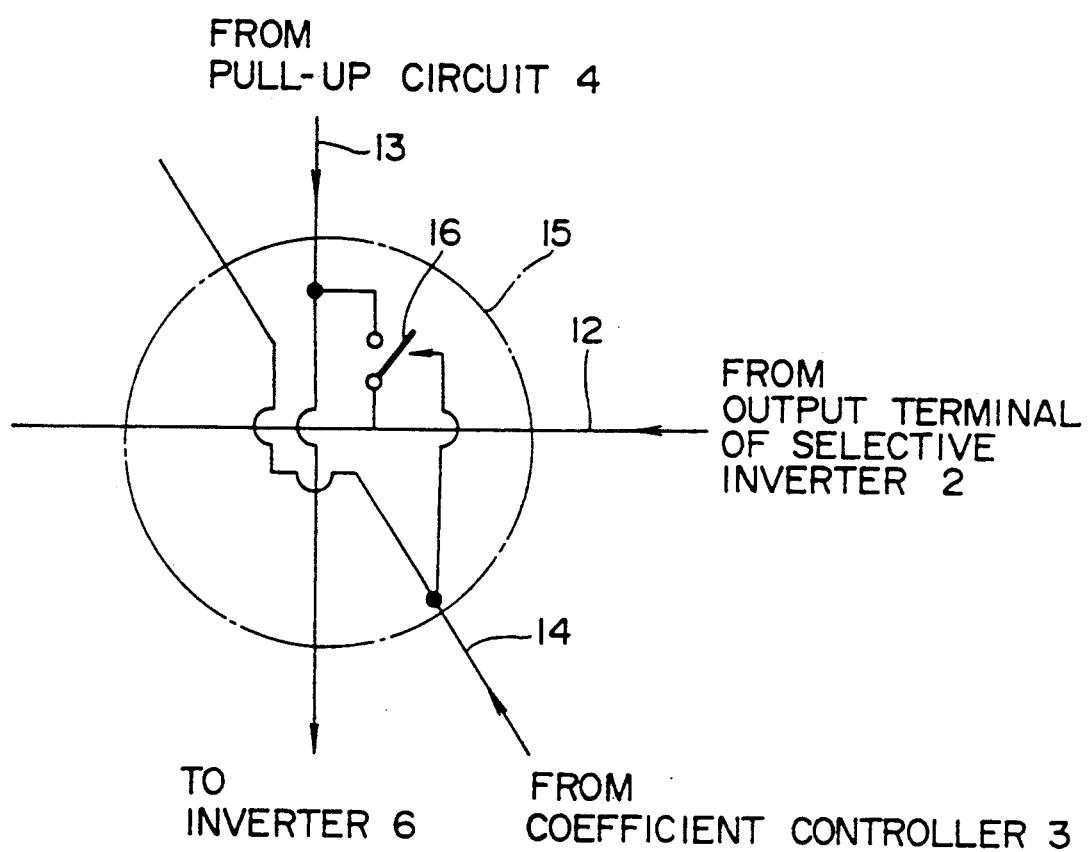
FIG. 2 is a detailed circuit diagram showing an exemplary structure of a selector switch employed in the circuit of FIG. 1.

In this embodiment, each of the selector switches 15 includes, as shown in FIG. 2, a switch 16 whose one end is connected to the other end of the resistor 11 via the output line 13 and whose other end is connected to the output terminal of the selective inverter 2 via the input line 12. And when a selection signal is supplied from the coefficient controller 3, the bit outputted from the selective inverter 2 is selected and then is supplied to the inverter 6 via the output line 13. In case none of selection signal is supplied from the coefficient controller 3, a bit signal indicative of "1" is produced by the voltage outputted from the pull-up circuit 4, and such bit signal is supplied to the inverter 6 via the output line 13.

The inverter 6 comprises eleven elementary inverters 17 for inverting the values of the individual bits supplied thereto via the output lines 13 of the bit position shifter 5, wherein the values of the individual bits supplied via the output lines 13 of the bit position shifter 5 are inverted and then are supplied to the accumulator 7.

The accumulator 7 comprises a changeover switch 18 for selectively taking in, as a preset initial value, the value in the stage (a) of Eq. (17) (values corresponding to the coefficients C0, C1 in the conditions of Eq. (1)) or the result of the preceding accumulation; an adder 19 for adding the preset initial value selected by the switch 18 (or the result of the preceding accumulation) and the bit string outputted from the inverter 6, and a register 20 for temporarily storing the value (the result of the present accumulation) obtained by the operation of the adder 19 and supplying such value to the switch 18. With the value in the stage (a) of Eq. (17) used as the preset initial value, the bit strings outputted sequentially from the inverter 6 are accumulated, and the value obtained by such accumulation is outputted as the result of calculating Eq. (17).

Now the operation of this embodiment will be described below with reference to FIGS. 3 through 8.

First cycle

First, when the bit values of the vector A are fed from the input terminal 8 as shown in FIG. 3, the selector switches 10 of the selective inverter 3 are changed by the coefficient controller 3 to thereby produce, from the individual bit values, an inverted bit string of the vector components in the stage (b) of Eq. (17) while selecting the 7th higher-order control line 14 in the bit position shifter 5, whereby an inversion of the bit string in the stage (b) of Eq. (17) is produced from the bit string obtained by the selective inverter 2, and such inverted bit string is further inverted by the inverter 6 to become the bit string shown in the stage (b) of Eq. (17) and then is supplied to the accumulator 7.

Thereafter the present bit string being outputted from the inverter 6 is added by the adder 19 in the accumulator 7 to the preset initial value selected by the selector switch 18, and the bit string (result of the present accumulation) obtained due to such operation is stored in the register 20.

Second cycle

Figure 4:
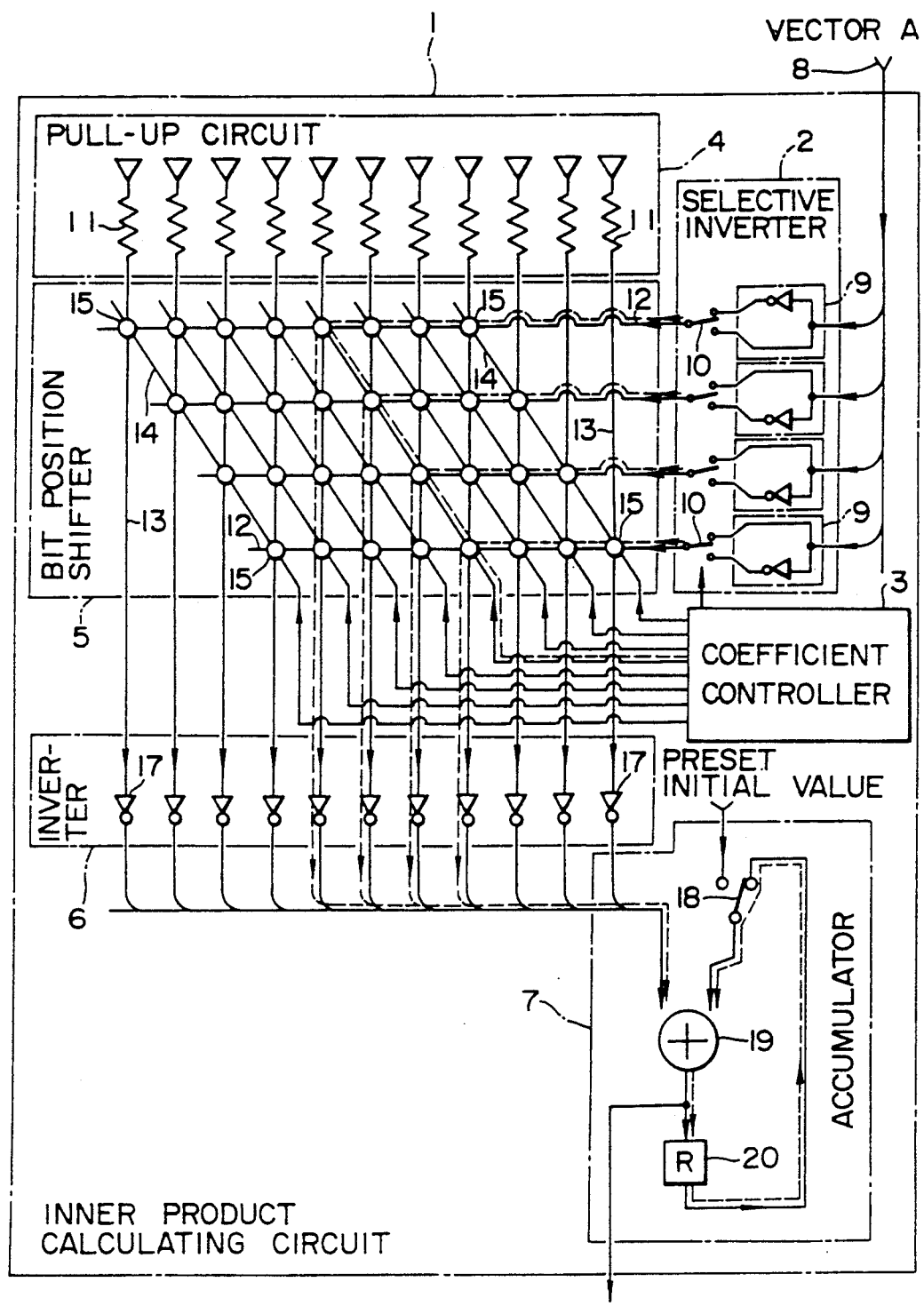
FIG. 4 is a typical diagram showing a second operation cycle in the inner product calculating circuit of FIG. 1.

Subsequently the 5th higher-order control line 14 in the bit position shifter 5 is selected in the state where the selector switches 10 remain connected as shown in FIG. 4, and an inversion of the bit string in the stage (c) of Eq. (17) is produced from the bit string obtained by the selective inverter 2. The inverted bit string thus obtained is further inverted by the inverter 6 to become the bit string shown in the stage (c) of Eq. (17) and then is supplied to the accumulator 7.

In parallel with such operation, the connection of the selector switch 18 in the accumulator 7 is changed to the register 20, and the result of the preceding accumulation stored in the register 20 is selected. Thereafter the adder 20 functions to add the present bit string outputted from the inverter 6 and the bit string (result of the preceding accumulation) selected by the selector switch 18, and the bit string obtained as the result of such addition is stored in the register 20 again.

Third cycle

Figure 5:
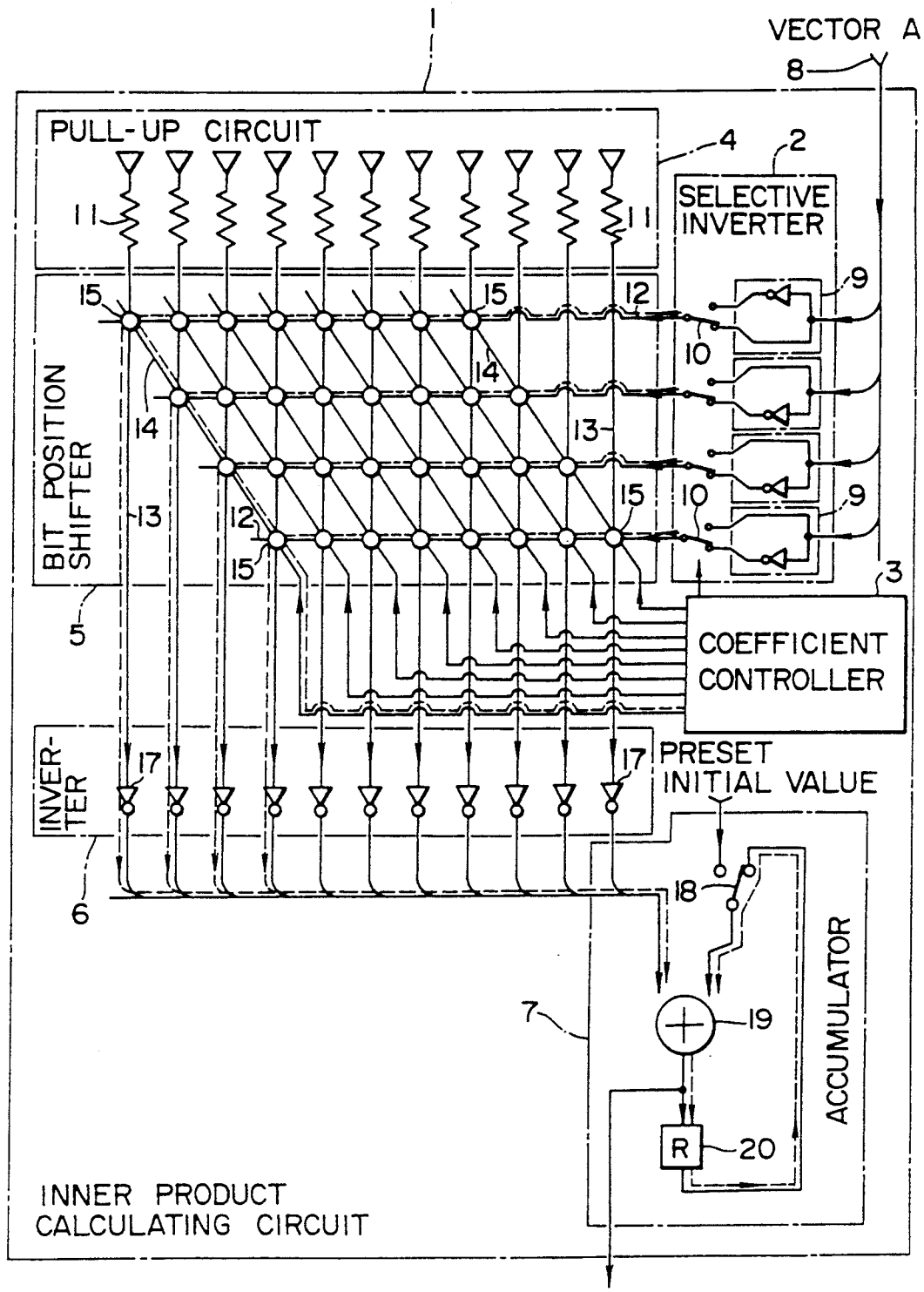
FIG. 5 is a typical diagram showing a third operation cycle in the inner product calculating circuit of FIG. 1.

Next the selector switches 10 are changed as shown in FIG. 5 so that an inverted string of the vector components in the stage (d) of Eq. (17) is produced from the bit values of the vector A fed to the input terminal 8, and the 1st highest-order control line 14 in the bit position shifter 5 is selected, whereby an inversion of the bit string shown in the stage (d) of Eq. (17) is produced from the bit string obtained by the selective inverter 2. The inverted bit string thus produced is further inverted by the inverter 6 to become the bit string shown in the stage (d) of Eq. (17) and then is supplied to the accumulator 7.

The present bit string outputted from the inverter 6 is added by the adder 19 of the accumulator 7 to the value (result of the preceding accumulation) in the register 20 selected by the selector switch 18, and the bit string (result of the present accumulation) obtained by the above operation is stored in the register 20 again.

Fourth cycle

Figure 6:
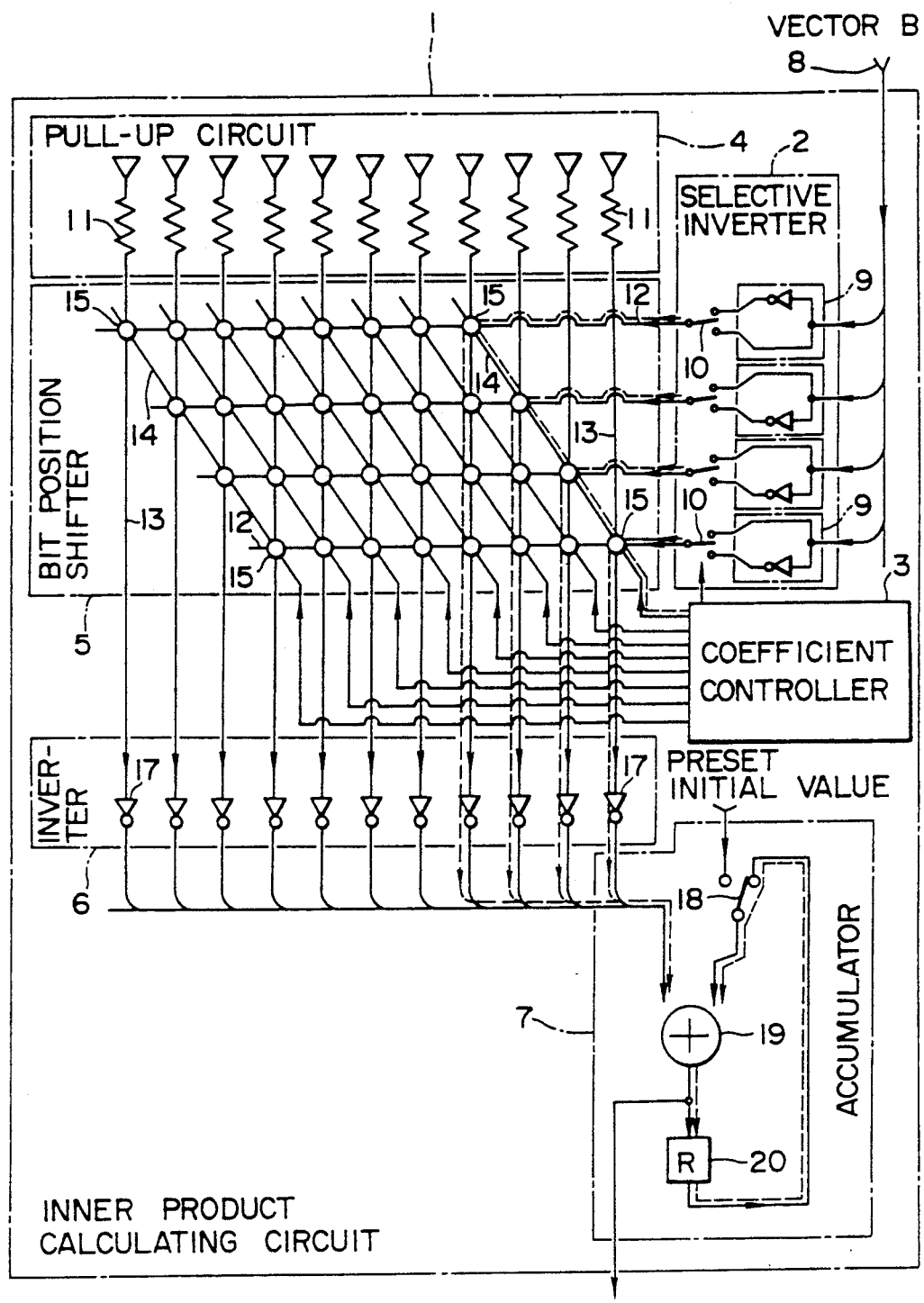
FIG. 6; is a typical diagram showing a fourth operation cycle in the inner product calculating circuit of FIG. 1.

Subsequently, the selector switches 10 are changed when the bit values of the vector B are supplied from the input terminal 8 as shown in FIG. 6, so that an inverted bit string of the vector components in the stage (e) of Eq. (17) is produced from the bit values of the vector B fed to the input terminal 8, and simultaneously the lowest-order control line 14 in the bit position shifter 5 is selected, whereby an inversion of the bit string shown in the stage (e) of Eq. (17) is produced from the bit string obtained by the selective inverter 2. The inverted bit string thus produced is further inverted by the inverter 6 to become the bit string shown in the stage (e) of Eq. (17) and then is supplied to the accumulator 7.

Thereafter the present bit string outputted from the inverter 6 is added by the adder 19 of the accumulator 7 to the value (result of the preceding accumulation) in the register 20 selected by the selector switch 18, and the bit string (result of the present accumulation) obtained by the above operation is stored in the register 20 again.

Fifth cycle

Figure 7:
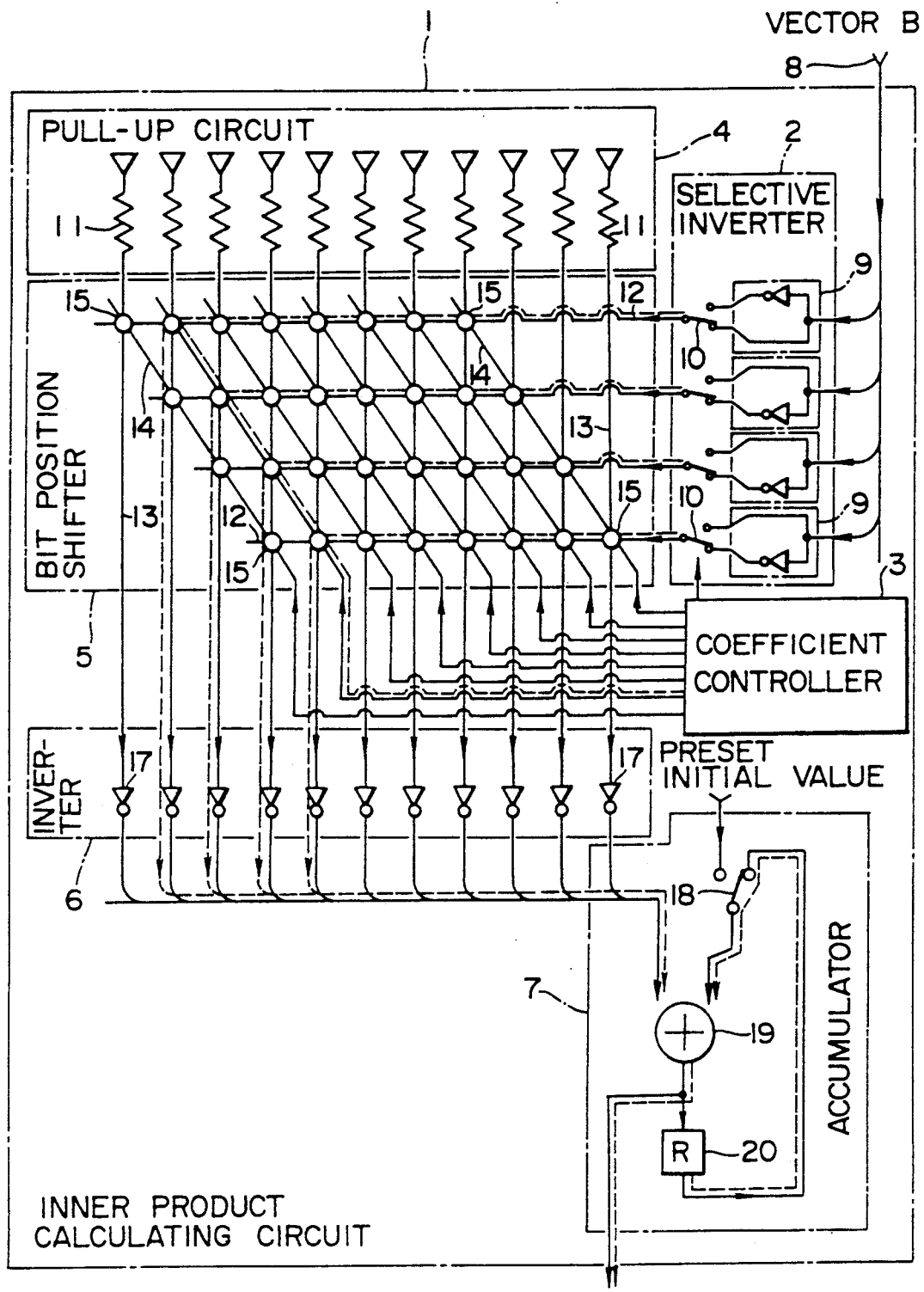
FIG. 7 is a typical diagram showing a fifth operation cycle in the inner product calculating circuit of FIG. 1.

Next the selector switches 10 are changed as shown in FIG. 7, so that an inverted bit string of the vector components in the stage (f) of Eq. (17) is produced from the bit values of the vector B fed to the input terminal 8, and simultaneously the 2nd higherorder control line 14 in the bit position shifter 5 is selected, whereby an inversion of the bit string in the stage (f) of Eq. (17) is produced from the bit string obtained by the selective inverter 2. The bit string thus produced is inverted again by the inverter 6 to become the bit string shown in the stage (f) of Eq. (17) and then is supplied to the accumulator 7.

Thereafter the present bit string outputted from the inverter 6 is added by the adder 19 of the accumulator 8 to the value (result of the preceding accumulation) in the register 20 selected by the selector switch 18, and the bit string (result of the present accumulation) obtained by the above operation is outputted as the result of calculating Eq. (17).

As mentioned, in this embodiment where the result of Eq. (1) is obtained by executing the calculation of Eq. (17), it becomes possible to eliminate the necessity of a powerful buffer or a low-order bit controller to consequently achieve a reduction in the circuit scale, and further to realize a high-speed inner product calculation with the coefficients C0 and C1 merely by presetting specific values as initial values in conformity with the coefficients.

Prior to giving an explanation on a detailed circuit configuration of a second embodiment, the principle of its operation will be described below.

First, the following equation is valid in a general bit calculation.

$$\left. \begin{array}{l} (0\,0\ldots0\,0\,1\,1\ldots1\,I_{n-1}\,I_{n-2}\ldots I_1\,I_0\,1\,1\ldots1\,1\,1)_2 + \\ (1\,1\ldots1\,1\,0\,0\ldots0\,1\quad 1\quad\ldots 1\,1\,0\,0\ldots0\,0\,1)_2 = \\ (0\,0\ldots0\,0\,0\,0\ldots0\,I_{n-1}\,I_{n-2}\ldots I_1\,I_0\,0\,0\ldots0\,0\,0)_2 \end{array} \right\} \quad (18)$$

Applying Eq. (18) to Eq. (17), there is obtained Eq. (19) as follows.

$$\begin{array}{l}
\begin{array}{cccccccccccc}
1 & 1 & 0 & 0 & 1 & 1 & 0 & 1 & 1 & 0 & 0 & 1 & 1 & \text{(a)} \\
 &  & 1 & 1 & 1 & 1 & 1 & 1 & A_3 & \underline{A_2} & \underline{A_1} & \underline{A_0} & 1 & \text{(b)} \\
1 & 1 &  &  &  &  &  & 1 & \overline{1} & \overline{1} & \overline{1} & 1 & \text{(c)} \\
 &  & 1 & 1 & 1 & 1 & A_3 & \underline{A_2} & \underline{A_1} & \underline{A_0} & 1 & 1 & 1 & \text{(d)} \\
1 & 1 &  &  &  &  & 1 & \overline{1} & \overline{1} & \overline{1} &  &  &  & \text{(e)} \\
 &  & \underline{A_3} & A_2 & A_1 & A_0 & 1 & 1 & 1 & 1 & 1 & 1 & 1 & \text{(f)} \\
1 & 1 & \overline{1} & 1 & 1 & 1 &  &  &  &  &  &  & 1 & \text{(g)} \\
 &  & 1 & 1 & 1 & 1 & 1 & 1 & 1 & B_3 & \underline{B_2} & \underline{B_1} & \underline{B_0} & \text{(h)} \\
1 & 1 &  &  &  &  &  &  & 1 &  &  &  &  & \text{(i)} \\
 &  & 1 & \underline{B_3} & B_2 & B_1 & B_0 & 1 & 1 & 1 & 1 & 1 & 1 & \text{(j)} \\
+\,1 & 1 &  & \overline{1} & 1 & 1 & 1 &  &  &  &  &  & 1 & \text{(k)} \\ \hline
\underline{O_{12}} & \underline{O_{11}} & \underline{O_{10}} & \underline{O_9} & \underline{O_8} & \underline{O_7} & \underline{O_6} & \underline{O_5} & \underline{O_4} & \underline{O_3} & \underline{O_2} & \underline{O_1} & \underline{O_0} & \text{(l)}
\end{array}
\end{array} \quad (19)$$

The values in Eq. (20) shown below can be obtained by extracting and calculating the stages (a), (c), (e), (g), (i) and (k) of Eq. (19).

$$\left. \begin{array}{l}
\begin{array}{cccccccccccc}
1 & 1 & 0 & 0 & 1 & 1 & 0 & 1 & 1 & 0 & 0 & 1 & 1 & \text{(a)} \\
1 & 1 &  &  &  &  &  &  & 1 & 1 & 1 & 1 & 1 & \text{(c)} \\
1 & 1 &  &  &  & 1 & 1 & 1 & 1 &  &  &  & 1 & \text{(e)} \\
1 & 1 & 1 & 1 & 1 & 1 &  &  &  &  &  &  & 1 & \text{(g)} \\
1 & 1 &  &  &  &  &  &  &  & 1 &  &  &  & \text{(i)} \\
+\,1 & 1 &  & 1 & 1 & 1 & 1 &  &  &  &  &  & 1 & \text{(k)} \\ \hline
1 & 1 & 1 & 0 & 1 & 1 & 0 & 0 & 1 & 1 & 1 & 0 & 1 & 
\end{array}
\end{array} \right\} \quad (20)$$

Eq. (19) can be rewritten as follows by using the result of calculating Eq. (20).

$$\left. \begin{array}{l}
\begin{array}{cccccccccccc}
1 & 1 & 1 & 0 & 1 & 1 & 0 & 0 & 1 & 1 & 1 & 0 & 1 & \text{(a)} \\
 &  & 1 & 1 & 1 & 1 & 1 & 1 & A_3 & \underline{A_2} & \underline{A_1} & \underline{A_0} & 1 & \text{(b)} \\
 &  & 1 & 1 & 1 & 1 & A_3 & \underline{A_2} & \underline{A_1} & \underline{A_0} & 1 & 1 & 1 & \text{(c)} \\
 &  & \underline{A_3} & A_2 & A_1 & A_0 & 1 & 1 & 1 & 1 & 1 & 1 & 1 & \text{(d)} \\
 &  & 1 & 1 & 1 & 1 & 1 & 1 & 1 & B_3 & \underline{B_2} & \underline{B_1} & \underline{B_0} & \text{(e)} \\
+ &  & 1 & \underline{B_3} & B_2 & B_1 & B_0 & 1 & 1 & 1 & 1 & 1 & 1 & \text{(f)} \\ \hline
\underline{O_{12}} & \underline{O_{11}} & \underline{O_{10}} & \underline{O_9} & \underline{O_8} & \underline{O_7} & \underline{O_6} & \underline{O_5} & \underline{O_4} & \underline{O_3} & \underline{O_2} & \underline{O_1} & \underline{O_0} & \text{(g)}
\end{array}
\end{array} \right\} \quad (21)$$

Thus, the values of Eq. (17) can be found by calculating Eq. (21) shown above.

The second embodiment of the present invention is based on the fundamental principle that finds the result of Eq. (1) by executing the calculation of Eq. (21).

Now the second embodiment of the invention adopting such fundamental principle will be described below in detail with reference to the accompanying drawings.

Figure 8:
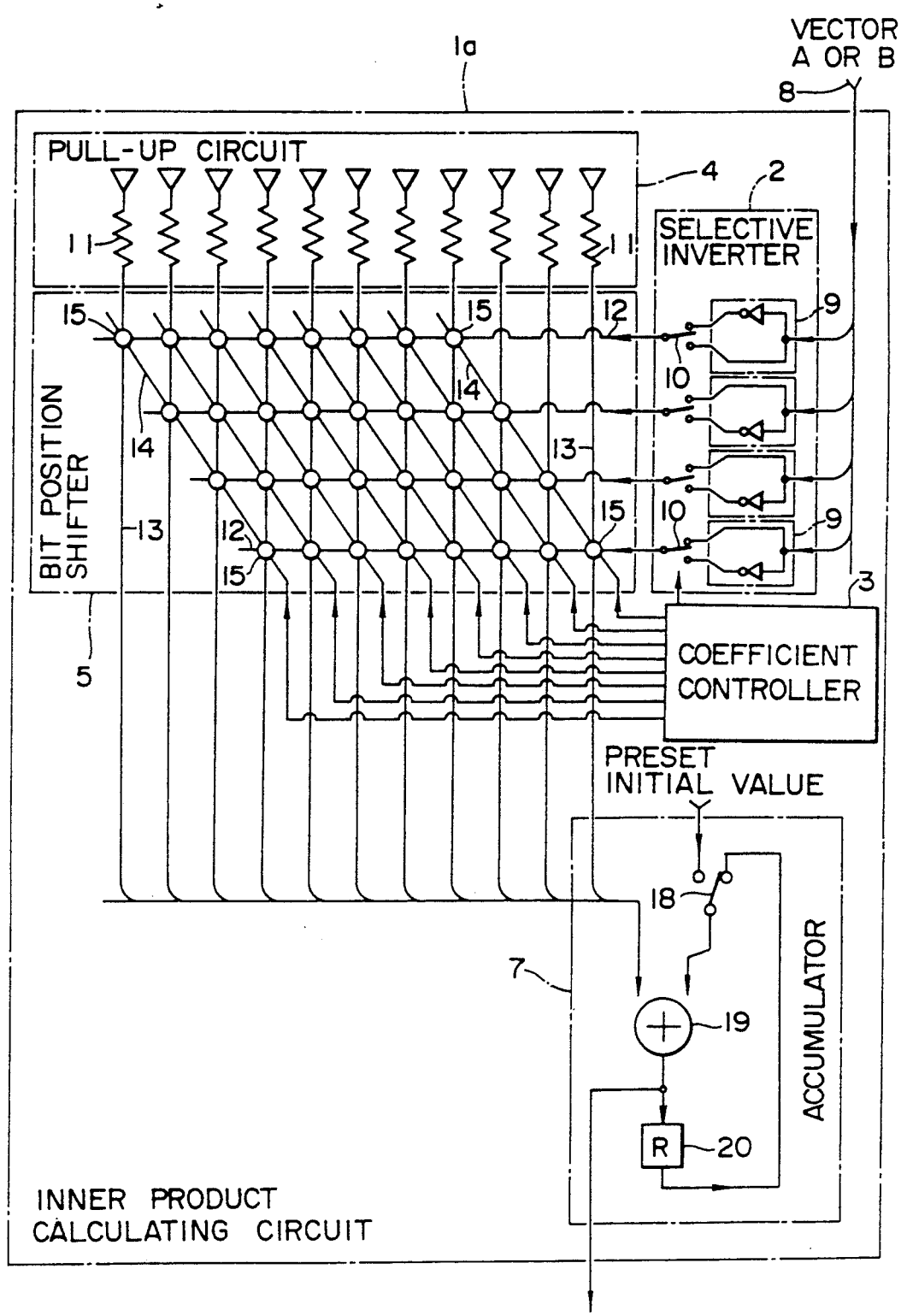
FIG. 8 is a block diagram of a second embodiment representing the inner product calculating circuit of the present invention.

FIG. 8 is a block diagram of the second embodiment representing the inner product calculating circuit of the invention. In this diagram, the same circuit components as those employed in FIG. 1 are denoted by the same reference numerals, and an explanation thereof will be given again.

An in inner product calculating circuit $1a$ shown in FIG. 8 comprises a selective inverter 2, a coefficient controller 3, a pull-up circuit 4, a bit position shifter 5 and an accumulator 7. The selective inverter 2 and the bit position shifter 5 are controlled by the coefficient controller 3 to cause individual noninversion or inversion of the bits of vectors A, B which are objects of the inner product calculation, while the bit positions of the vectors A, B are shifted to produce bit strings shown in the stages (b) through (f) of Eq. (21). Then the accumulator 7 functions to sequentially accumulates the preset initial value in the stage (a) of Eq. (21) and the bit strings in the stages (b) to (f) of Eq. (21) outputted from the bit position shifter 5, thereby calculating and delivering the inner product value $\overline{O}$ of Eq. (21).

The coefficient controller 3 has a control table with selectable data corresponding to the values of the coefficients C0, C1 to be calculated for the inner product, and also has a read circuit and so forth for reading out the selectable data included in such control table. The selectable data are read out from the control table in response to an input clock signal to produce two selected signals, which are then supplied to the selective inverter 2 and the bit position shifter respectively.

The selective inverter 2 comprises four inverting/non-inverting circuits 9 for individual bits of the vectors A, B fed to the input terminal 8, and four selector switches 10 for selecting either the inverted bit signals or the non-inverted bit signals outputted from such inverting/non-inverting circuits 9. The bits of the vector A or B fed to the input terminal 8 are inverted or non-inverted by the inverting/noninverting circuits 9, and either the inverted bits or the non-inverted bits outputted from the inverting/noninverting circuits 9 are selected in accordance with the selection signal outputted from the coefficient controller 3 and then are supplied to the bit position shifter 5.

The pull-up circuit 4 has eleven resistors 11 and serves to pull up the selector switches 15 of the bit position shifter 5 by the voltage being applied to one end of each resistor 11.

The bit position shifter 5 comprises four bit input lines (horizontal lines) 12, eleven output lines (vertical lines) 13, eight control lines (oblique lines) 14, and a plurality of selector switches 15 disposed at the intersections of the input lines 12 and the control lines 14. When a selection signal is supplied from the coefficient controller 3 to any of the control lines 14, the positions of the bits being fed from the selective inverter 2 to the input lines 12 are determined, and "1" is set in any other bit than the above bits to form an 11-bit string, which is then supplied to the accumulator 7.

Figure 9:
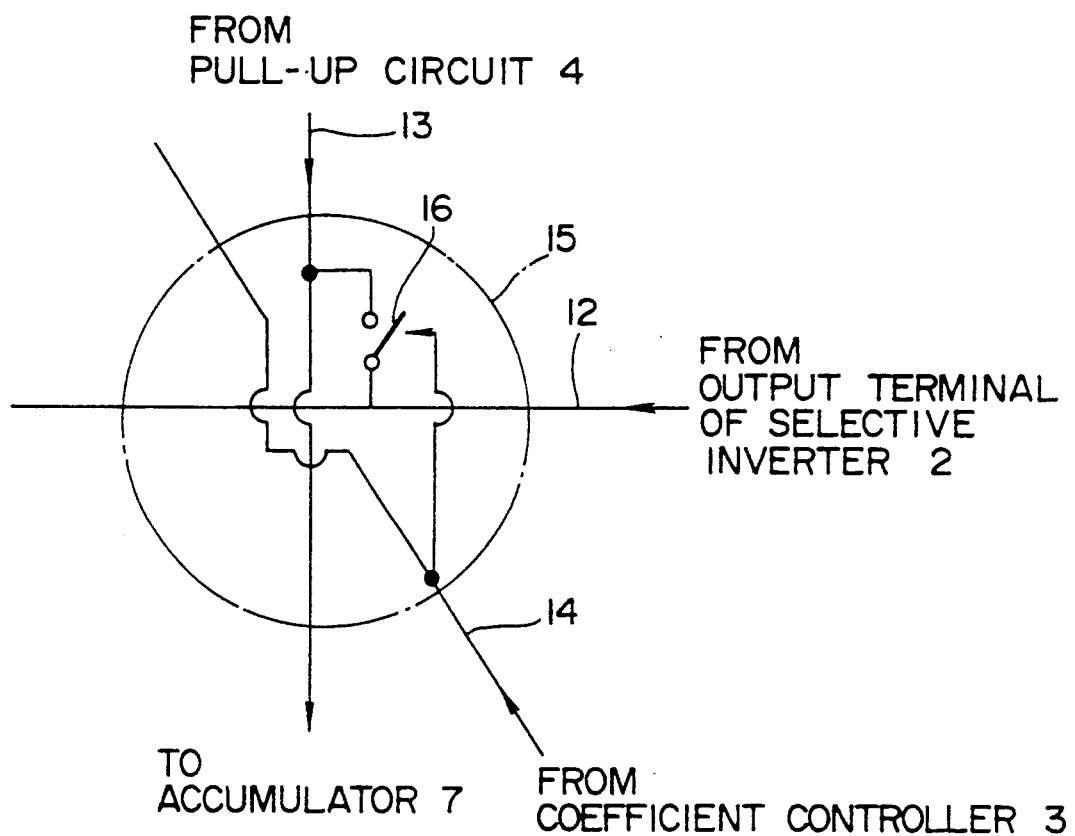
FIG. 9 is a detailed circuit diagram showing an exemplary structure of a selector switch employed in the circuit of FIG. 8.

In this embodiment, each of the selector switches 15 includes, as shown in FIG. 9, a switch 16 whose one end is connected to the other end of the resistor 11 via the output line 13 and whose other end is connected to the output terminal of the selective inverter 2 via the input line 12. And when a selection signal is supplied from the coefficient controller 3, the bit outputted from the selective inverter 2 is selected and then is supplied to the accumulator 7 via the output line 13. In case none of selection signal is supplied from the coefficient controller 3, a bit signal indicative of "1" is produced by the voltage outputted from the pull-up circuit 4, and such bit signal is supplied to the accumulator 7 via the output line 13.

The accumulator 7 comprises a changeover switch 18 for selectively taking in, as a preset initial value, the value in the stage (a) of Eq. (21) or the result of the preceding accumulation; an adder 19 for adding the preset initial value selected by the switch 18 (or the result of the preceding accumulation) and the bit string outputted from the bit position shifter 5, and a register 20 for temporarily storing the value (the result of the present accumulation) obtained by the operation of the adder 19 and supplying such value to the switch 18. With the value in the stage (a) of Eq. (21) used as the preset initial value, the bit strings outputted sequentially from the bit position shifter 5 are accumulated, and the resultant bit string obtained by such accumulation is outputted as the result of calculating Eq. (21).

Now the operation of this embodiment will be described below with reference to FIGS. 10 through 14.

First cycle

Figure 10:
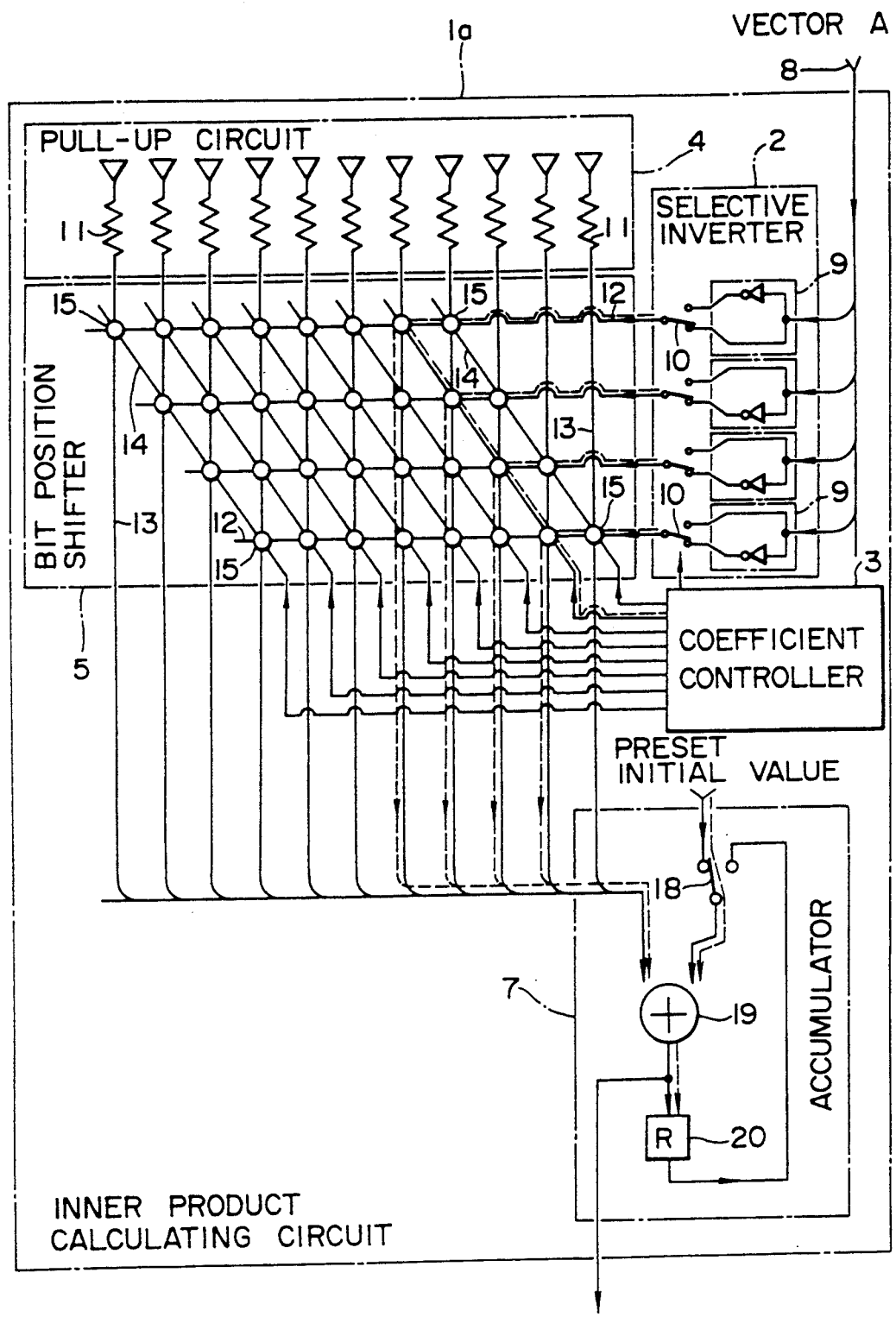
FIG. 10 is a typical diagram showing a first operation cycle in the inner product calculating circuit of FIG. 8.

First, when the bit values of the vector A are fed from the input terminal 8 as shown in FIG. 10, the selector switches 10 of the selective inverter 3 are changed by the coefficient controller 3 to thereby produce, from the individual bit values, a bit string of the vector components in the stage (b) of Eq. (21) while selecting the 7th higher-order control line 14 in the bit position shifter 5, whereby the bit string in the stage (b) of Eq. (21) is produced from the bit string obtained by the selective inverter 2, and such bit string is supplied to the accumulator 7.

Thereafter the present bit string being outputted from the bit position shifter 5 is added by the adder 19 in the accumulator 7 to the preset initial value selected by the selector switch 18, and the bit string (result of the present accumulation) obtained due to such operation is stored in the register 20.

Second cycle

Figure 11:
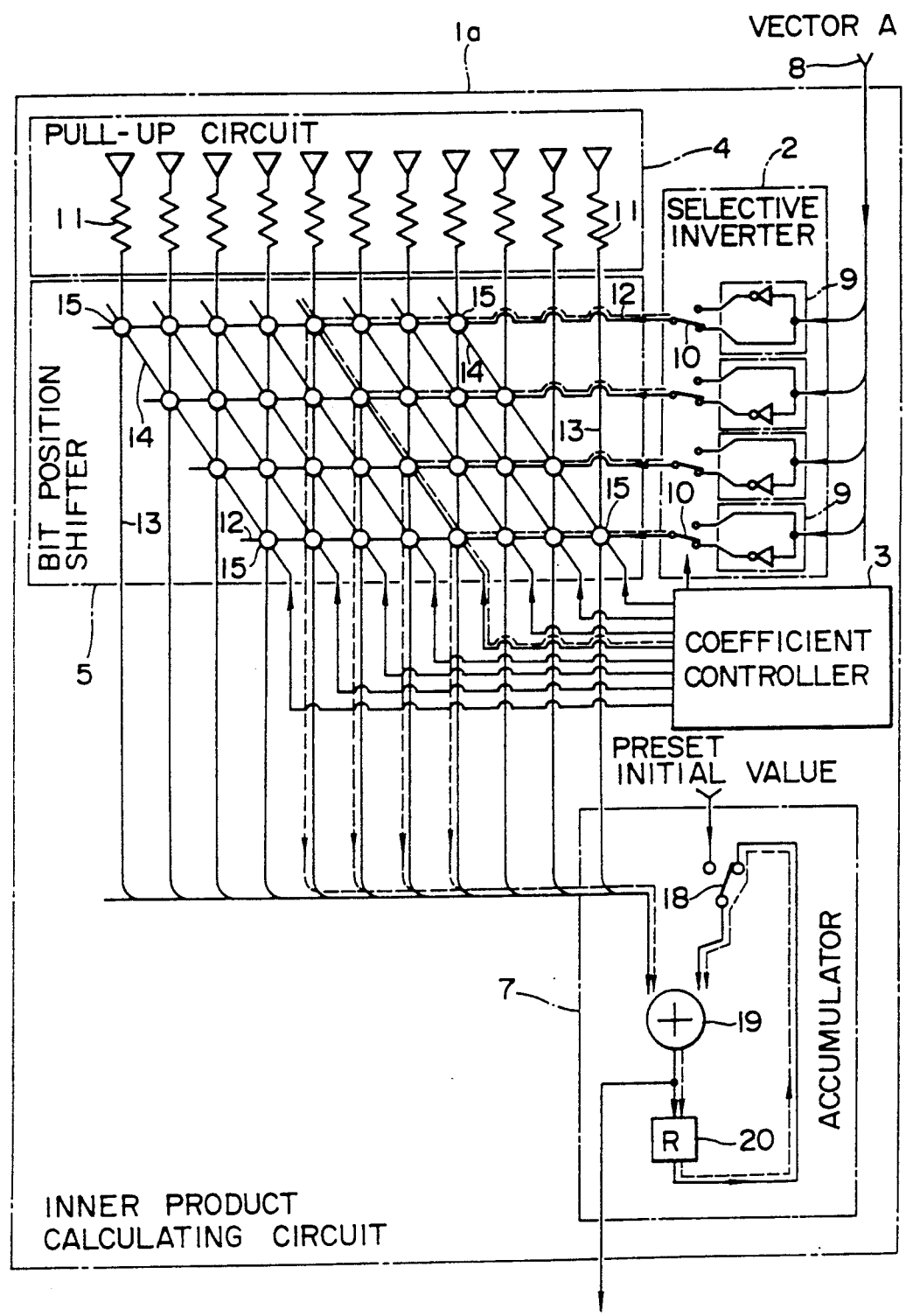
FIG. 11 is a typical diagram showing a second operation cycle in the inner product calculating circuit of FIG. 8.

Subsequently the 5th higher-order control line 14 in the bit position shifter 5 is selected in the state where the selector switches 10 remain connected as shown in FIG. 11, and the bit string in the stage (c) of Eq. (21) is produced from the bit string obtained by the selective inverter 2. Then the bit string thus obtained is supplied to the accumulator 7.

In parallel with such operation, the connection of the selector switch 18 in the accumulator 7 is changed to the register 20, and the result of the preceding accumulation stored in the register 20 is selected. Thereafter the adder 20 functions to add the present bit string outputted from the bit position shifter 5 and the bit string (result of the preceding accumulation) selected by the selector switch 18, and the bit string obtained as the result of such addition is stored in the register 20 again.

Third cycle

Next the selector switches 10 are changed as shown in FIG. 12 so that a bit string of the vector components in the stage (d) of Eq. (21) is produced from the bit values of the vector A fed to the input terminal 8, and the 1st highest-order control line 14 in the bit position shifter 5 is selected, whereby the bit string shown in the stage (d) of Eq. (21) is produced from the bit string obtained by the selective inverter 2. Then the bit string thus produced is supplied to the accumulator 7.

The present bit string outputted from the bit position shifter 5 is added by the adder 19 of the accumulator 7 to the value (result of the preceding accumulation) in the register 20 selected by the selector switch 18, and the bit string (result of the present accumulation) obtained by the above operation is stored in the register 20 again.

Fourth cycle

Figure 13:
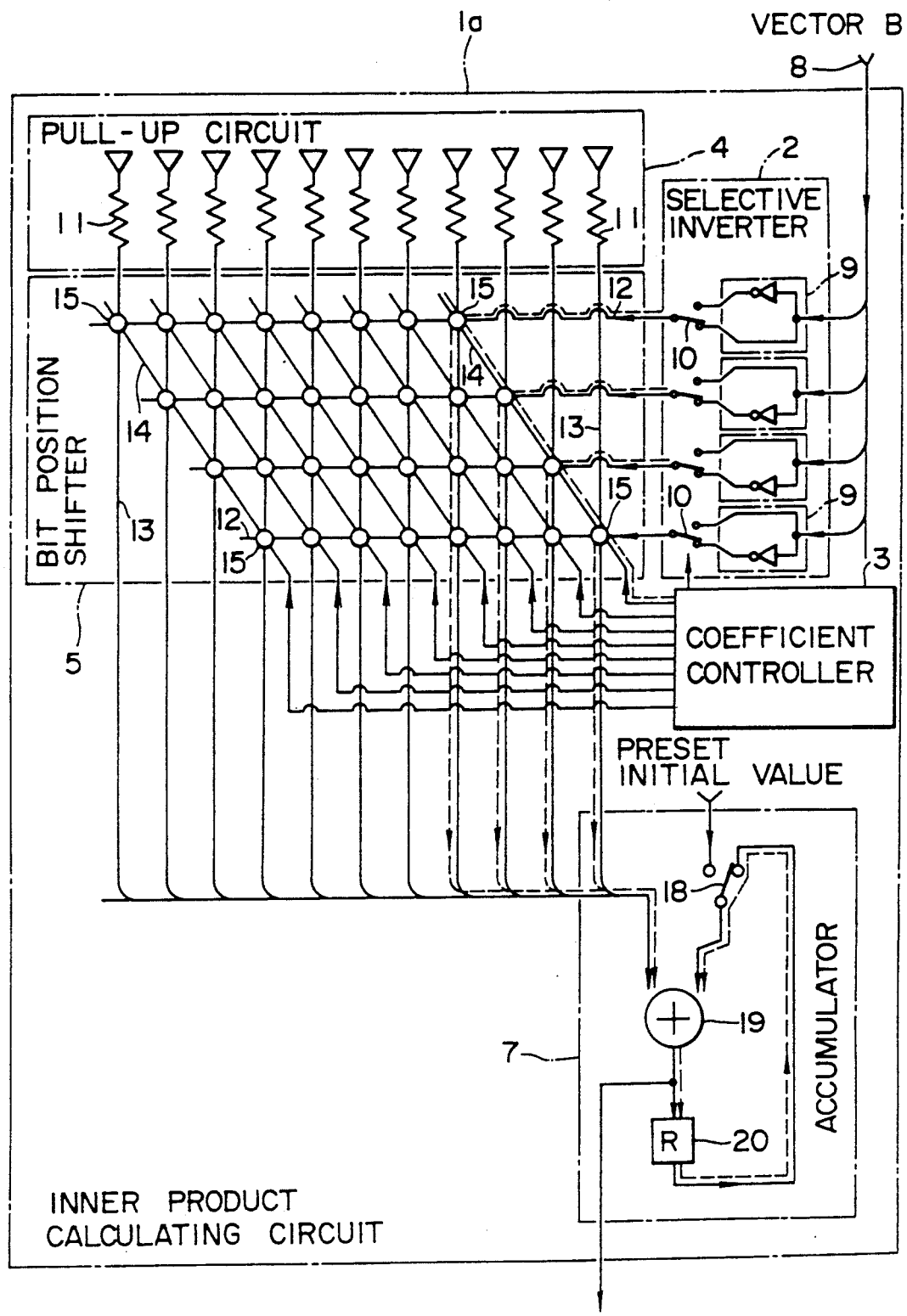
FIG. 13 is a typical diagram showing a fourth operation cycle in the inner product calculating circuit of FIG. 8.

Subsequently, the selector switches 10 are changed when the bit values of the vector B are supplied from the input terminal 8 as shown in FIG. 13, so that a bit string of the vector components in the stage (e) of Eq. (21) is produced from the bit values of the vector B fed to the input terminal 8, and simultaneously the lowest-order control line 14 in the bit position shifter 5 is selected, whereby the bit string shown in the stage (e) of Eq. (21) is produced from the bit string obtained by the selective inverter 2. Then the bit string thus produced is supplied to the accumulator 7.

Thereafter the present bit string outputted from the bit position shifter 5 is added by the adder 19 of the accumulator 7 to the value (result of the preceding accumulation) in the register 20 selected by the selector switch 18, and the bit string (result of the present accumulation) obtained by the above operation is stored in the register 20 again.

Fifth cycle

Figure 14:
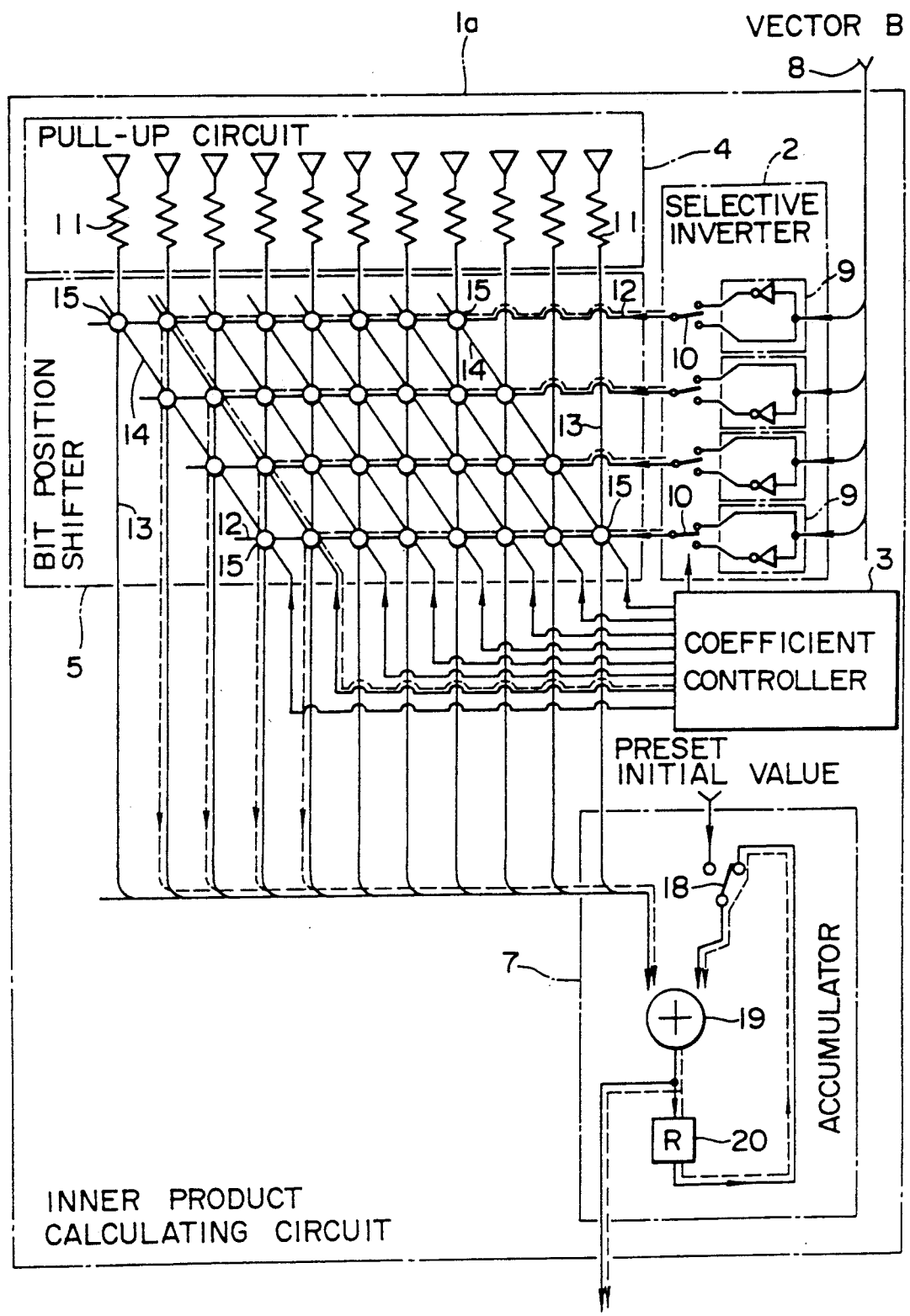
FIG. 14 is a typical diagram showing a fifth operation cycle in the inner product calculating circuit of FIG. 8.

Next the selector switches 10 are changed as shown in FIG. 14, so that a bit string of the vector components in the stage (f) of Eq. (21) is produced from the bit values of the vector B fed to the input terminal 8, and simultaneously the 2nd higher-order control line 14 in the bit position shifter 5 is selected, whereby the bit string in the stage (f) of Eq. (21) is produced the bit string obtained by the selective inverter 2. Then the bit string thus produced is supplied to the accumulator 7.

Thereafter the present bit string outputted from the bit position shifter 5 is added by the adder 19 of the accumulator 8 to the value (result of the preceding accumulation) in the register 20 selected by the selector switch 18, and the bit string (result of the present accumulation) obtained by the above operation is outputted as the result of calculating Eq. (21).

As mentioned, in this embodiment where the result of Eq. (1) is obtained by executing the calculation of Eq. (21), it becomes possible to eliminate the necessity of a powerful buffer or a low-order bit controller to consequently achieve a reduction in the circuit scale, and further to realize a high-speed inner product calculation with the coefficients C0 and C1 merely by presetting specific values as initial values in conformity with the coefficients.

Figure 15:
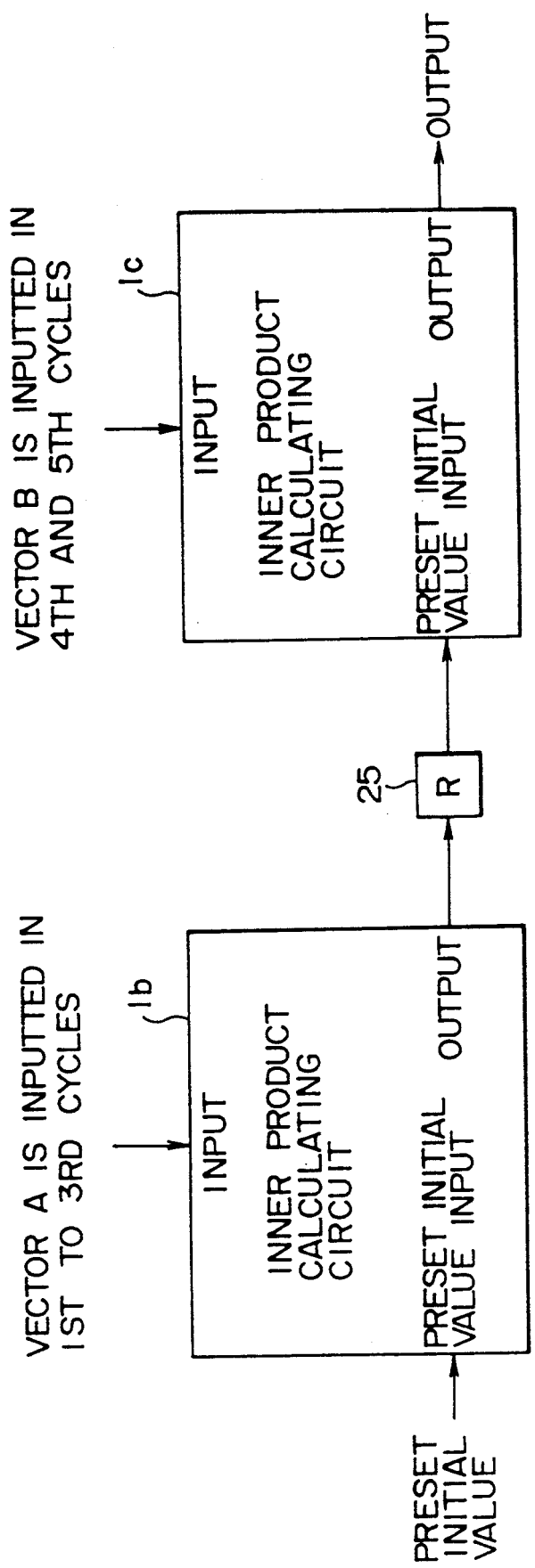
FIG. 15 is a block diagram of a third embodiment representing the inner product calculating circuit of the present invention.

FIG. 15 is a block diagram of a third embodiment representing the inner product calculating circuit of the present invention.

The inner product calculating circuit shown in this diagram comprises two inner product calculating circuits $1b$, $1c$ and a register 25. In one inner product calculating circuit $1b$, the stages (a) of Eq. (17) or those of Eq. (21) are accumulated on the basis of the preset initial value and the vector A, and the result of such accumulation is supplied via the register 25 to the other inner product calculating circuit $1c$. Then the stages (e) and (f) of Eq. (17) or those of Eq. (21) are accumulated on the basis of the vector B and the output of the inner product calculating circuit $1b$ supplied to the circuit $1c$ via the register 25, whereby the result of the calculation shown in Eq. (17) or Eq. (21) is obtained.

One inner product calculating circuit 1b consists of the aforementioned inner product calculating circuit 1 shown in FIG. 1 (or the inner product calculating circuit 1a in FIG. 8) and, after executing an accumulation of the stages (a) to (d) of Eq. (17) or those of Eq. (21) on the basis of the preset initial value and the vector A, supplies the result of such accumulation to the register 25.

The register 25 takes in the result of the calculation outputted from the inner product calculating circuit 1b and, after temporarily storing such result therein, supplies the same to the other inner product calculating circuit 1c. Similarly to the foregoing inner product calculating circuit 1b, the other circuit 1c consists of the inner product calculating circuit 1 shown in FIG. 1 (or the inner product calculating circuit 1a in FIG. 8) and functions to accumulate the stages (e) and (f) of Eq. (17) or those of Eq. (21) on the basis of the vector B and the output of the inner product calculating circuit 1b delivered from the register 25, thereby finding the result of the calculation expressed by Eq. (17) or Eq. (21).

Thus, in the third embodiment, a calculation of the preset initial value and the vector A is executed by one inner product calculating circuit 1b, while a calculation of the output of the inner product calculating circuit 1b and the vector B is executed by the other inner product calculating circuit 1c. Therefore, it becomes possible to perform the calculation of Eq. (17) or Eq. (21) merely by setting the vector A in one inner product calculating circuit 1b while setting the vector B in the other inner product calculating circuit 1c, hence eliminating the necessity of a powerful buffer or a low-order bit controller to consequently achieve a reduction in the circuit scale with another advantage of realizing a high-speed inner product calculation with the coefficients C0 and C1 merely by presetting specific values as initial values in conformity with the coefficients.

FIG. 16 is a block diagram of a fourth embodiment representing the inner product calculating circuit of the present invention.

The inner product calculating circuit shown in this diagram comprises two inner product calculating circuits 1d, 1e and an adder 26. One inner product calculating circuit 1d accumulates the stages (a) to (d) of Eq. (17) or those of Eq. (21) on the basis of the preset initial value and the vector A, while the other inner product calculating circuit 1e accumulates the stages (e) and (f) of Eq. (17) or those of Eq. (21) on the basis of the preset value "0" and the vector B. Thereafter the adder 26 adds the results of the accumulations executed by the two inner product calculating circuits 1d, 1e to consequently find the result of the calculation expressed by Eq. (17) or Eq. (21).

One inner product calculating circuit 1d consists of the aforementioned inner product calculating circuit 1 shown in FIG. 1 (or the inner product calculating circuit 1a in FIG. 8) and, after executing an accumulation of the stages (a) to (d) of Eq. (17) or those of Eq. (21) on the basis of the preset initial value and the vector A, supplies the result of such accumulation to the adder 26.

Similarly to the foregoing inner product calculating circuit 1d, the other circuit 1e consists of the inner product calculating circuit 1 shown in FIG. 1 (or the inner product calculating circuit 1a in FIG. 8) and, after accumulating the stages (e) and (f) of Eq. (17) or those of Eq. (21) on the basis of the preset initial value "0" and the vector B, supplies the result of such accumulation to the adder 26.

The adder 26 then adds the results of the accumulations outputted from the two inner product calculating circuits 1d and 1e, thereby finding and delivering the result of the calculation expressed by Eq. (17) or Eq. (21).

Thus, in the fourth embodiment, a calculation of the preset initial value and the vector A is executed by one inner product calculating circuit 1d, while a calculation of the preset value "0" and the vector B is executed by the other inner product calculating circuit 1e. Therefore, it becomes possible to perform the calculation of Eq. (17) or Eq. (21) through a less number of operation cycles in comparison with that in any of the other embodiments merely by setting the vector A in one inner product calculating circuit 1d while setting the vector B in the other inner product calculating circuit 1e, hence eliminating the necessity of a powerful buffer or a low-order bit controller to consequently achieve a reduction in the circuit scale with another advantage of realizing a high-speed inner product calculation with the coefficients C0 and C1 by presetting specific values as initial values in conformity with the coefficients.

In each of the above four embodiments, a description has been given with regard to the inner product calculating circuit relative to the vector coefficients C0 and C1 in Eq. (1). However, it is to be understood that even when such coefficients C0 and C1 have any other values, the result of the inner product calculation can still be found by first determining the preset initial values and the control data in the same procedure as mentioned, then rewriting the control table in the coefficient control circuit 3 on the basis of such data, and changing the preset initial values for the accumulator 7.

Furthermore, each of the above embodiments represents an exemplary case of applying the present invention to a quadratic inner product calculation where the input data has a 4-bit word length. However, the application is not limited to such example alone, and it is possible to apply the present invention to a linear, cubic or higher-degree inner product calculation where the input data has any word length other than a 4-bit length.

According to the present invention, as described hereinabove, the circuit scale is reducible due to elimination of the necessity of a powerful buffer or a low-order bit controller, and a fast inner product calculation using the coefficients can be executed merely by presetting specific values as initial values in conformity with the coefficients.

What is claimed is:

1. An inner product calculating circuit for executing a calculation of an inner product on the basis of one or more vector data and one or more coefficients, said circuit comprising:

a selective inverter for selectively inverting individual bits of said vector data;

a bit position shifter for shifting, in accordance with said coefficients, the bit positions of the vector data inverted selectively by said selective inverter;

a bit supplementer for supplementing, with either "1" or "0", any vacant bit of the vector data where the bit positions have been shifted by said bit position shifter; and an accumulator for accumulating the initial values preset in conformity with the coefficients and the vector data supplemented with "1" or "0" in any vacant bit thereof by said bit supplementer.

* * * * *